C. GILBERTSON & K. W. TANNER.
AUTOMOBILE PULL-OUT.
APPLICATION FILED APR. 27, 1918.

1,293,754. Patented Feb. 11, 1919.

WITNESSES

INVENTORS
CHARLES GILBERTSON
KRISTIAN W. TANNER
BY Fetherstonhaugh & Co
ATTYS.

UNITED STATES PATENT OFFICE.

CHARLES GILBERTSON AND KRISTIAN W. TANNER, OF CAMROSE, ALBERTA, CANADA.

AUTOMOBILE PULL-OUT.

1,293,754.  Specification of Letters Patent.  Patented Feb. 11, 1919.

Application filed April 27, 1918. Serial No. 231,249.

*To all whom it may concern:*

Be it known that we, CHARLES GILBERTSON and KRISTIAN W. TANNER, of the town of Camrose, Province of Alberta, and Dominion of Canada, have invented certain new and useful Improvements in Automobile Pull-Outs, and do hereby declare that the following is a full, clear, and exact description of the invention, such as will enable others skilled in the art to which it appertains to make and use the same.

This invention relates to improvements in automobile pullouts, and the objects of the invention are to facilitate transmitting the power of the driving wheels of the automobile to the pullout, so that the automobile may be readily removed from a mud hole, to permit of the pullout being readily mounted on the driving wheels of an automobile, and to render the pullout collapsible, so that it will occupy a minimum of space when not in use and can be readily stored in the automobile without inconvenience.

With the above and other objects in view the invention consists essentially of the improved construction particularly described and set forth in the following specification and accompanying drawings forming part of the same.

In the drawings.

Like characters of reference refer to like parts in the several figures.

Figure 1:
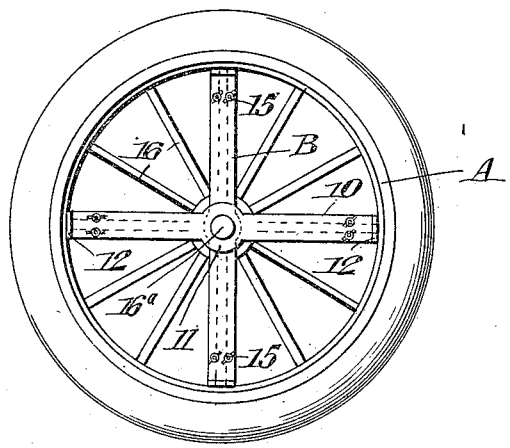
Figure 1 is a side elevation of the driving wheel of an automobile showing the improved pullout mounted thereon.

Referring to the drawings, A represents the driving wheel of an automobile, and B the improved pullout mounted thereon.

This pullout consists of two members 10 and 11, which in the embodiment illustrated comprise flat bars having the ends 12 flanged or bent at right angles to the body of the bar, each of the said bars having an orifice 13 through the center thereof.

The member 11 is provided intermediate of its length with an offset portion forming a recess 14 the side walls of which frictionally embrace the edges of the member 10.

Each of the members 10 and 11 are provided adjacent to their flanged ends with pairs of orifices through which the parallel arms of the U-bolts 15 pass.

When this pullout is in use the member 10 is positioned in such a manner that the orifice 13 fits over the axle housing 16 of the wheel A and the U-bolts 15 are positioned to embrace a pair of diametrically opposed spokes 16 whereupon when the winged nuts of the bolts are tightened the member 10 is securely positioned on the wheel.

The member 11 is now placed in position with the orifice 13 fitting over the axle housing 16 of the wheel A and in this position the recess 14 bridges the center of the member 10.

The U-bolts 15 are now positioned to secure the member 11 to the spokes 16 of the wheel A.

Figure 2:
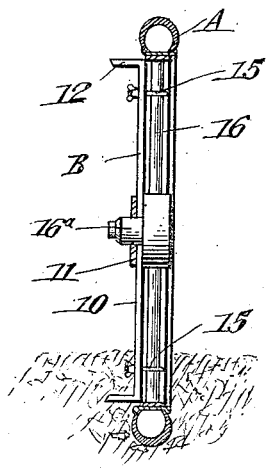
Fig. 2 is a vertical section of the driving wheel with the improved pullout mounted thereon, and as seen when the wheel has sunk in a mud hole.
Figure 3:
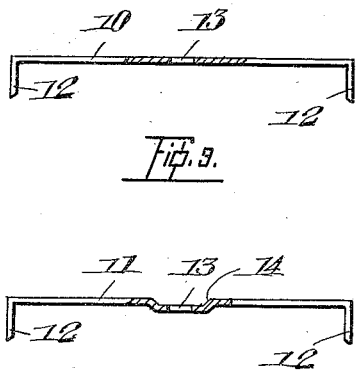
Fig. 3 is a side elevation partly sectional of one member of the pull out.
Figure 4:
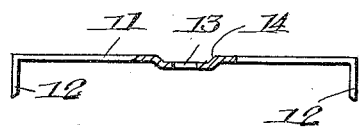
Fig. 4 is a cross section through one of the members.

By reference to Fig. 2 it will be seen that the flanges 12 extend outwardly from the face of the wheel and during the rotation of the wheel these flanges will afford a gripping means on the material located in a mud hole and so permit of the tractive force of the wheel A being utilized to pull the wheel out of the said mud hole.

By the use of this pullout there is no liability of the wheel A spinning and slipping when endeavoring to extract the wheel from the mud hole.

By forming the member 11 with a recess 14 this member will be arranged diagonally across the member 10 and when the said members are positioned on the wheel A the stress exerted on the members 10 and 11 will be transmitted uniformly throughout the spokes 16 on which the members are mounted.

When the pullout has been disassembled the members 10 and 11 can be arranged along side each other and so occupy a minimum of space.

As many changes could be made in the above construction and many apparently widely different embodiments of our invention, within the scope of the claim constructed without departing from the spirit or scope thereof, it is intended that all matter contained in the accompanying drawings shall be interpreted as illustrative and not in a limiting sense.

What we claim as our invention is:

A pullout comprising a pair of bars having flanged ends and orifices through their center, one of the bars being recessed intermediate of its length whereby the other bar is retained diagonally across the said bar and U-bolts for securing the bars to a wheel.

In witness whereof we have hereunto set our hands in the presence of two witnesses.

CHARLES GILBERTSON.
KRISTIAN W. TANNER.

Witnesses:
HELENA P. HENK,
J. K. BURGESS.